May 24, 1966     P. R. CONROY     3,252,507

MULTI-UNIT AIR-CONDITIONING SYSTEMS

Filed June 17, 1963     2 Sheets-Sheet 1

PATRICK R. CONROY
INVENTOR.

BY Le Roy J. Leishman

AGENT

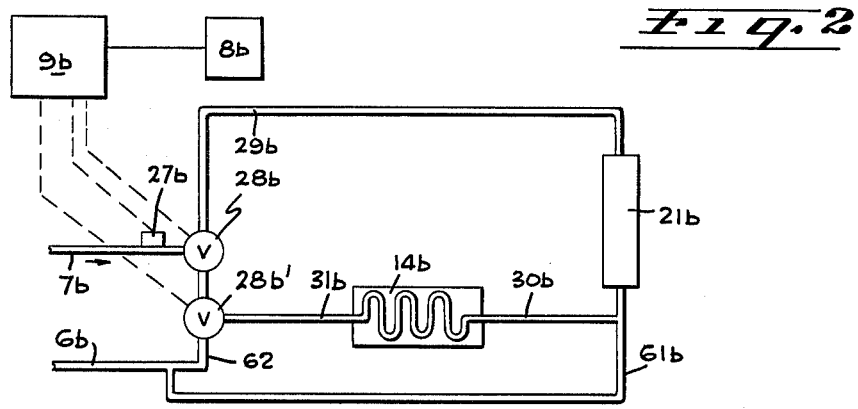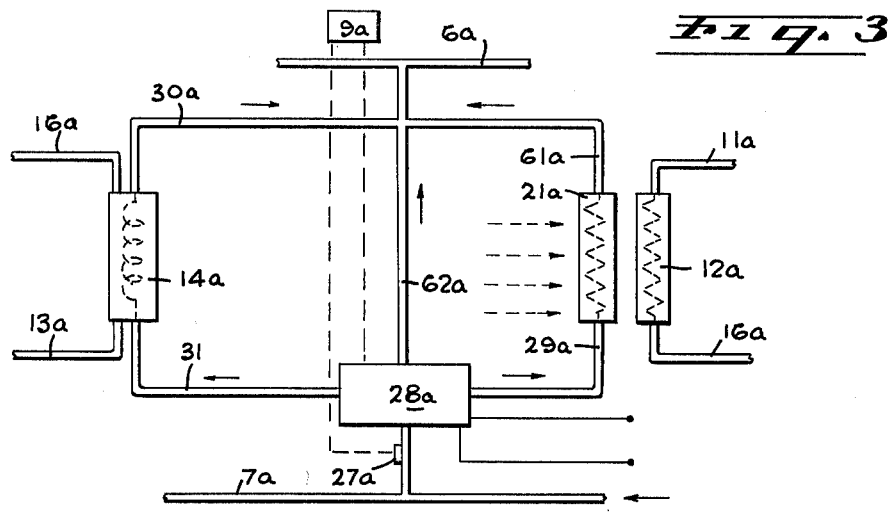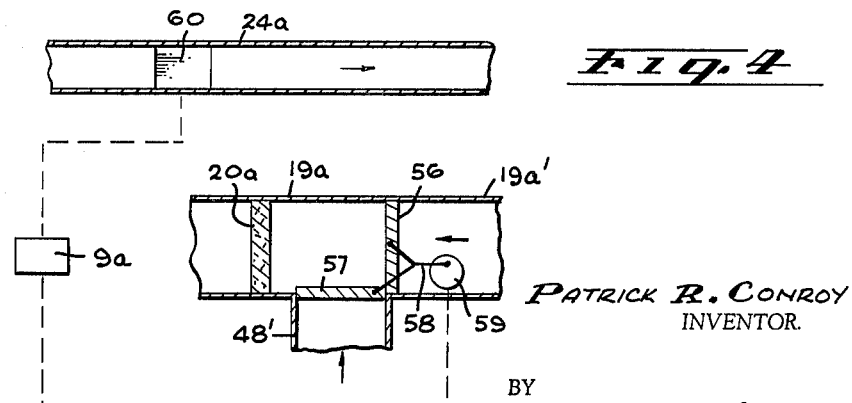

United States Patent Office 3,252,507
Patented May 24, 1966

3,252,507
MULTI-UNIT AIR-CONDITIONING SYSTEMS
Patrick R. Conroy, 534-B Gale Ave., Hawthorne, Calif.
Filed June 17, 1963, Ser. No. 288,255
6 Claims. (Cl. 165—22)

The invention herein described pertains to apparatus for heating and cooling enclosed areas according to individual area requirements, and more particularly to a system using a common circulating fluid heat-transfer medium that is brought to a predetermined temperature by means of apparatus common to all the areas or zones, each of these zones having apparatus for transferring heat from the medium to the zone or from the zone to the medium.

Air conditioning systems in which the air for a multiple-unit building is conditioned at a central plant have been in use for many years, as have systems for heating a building by means of hot water or steam from a central source. Systems combining both heating and cooling facilities are also well known. Moreover, equipment has long been available for either heating or cooling individual rooms, these functions usually being performed by separate and distinct local apparatus.

One object of the present invention is to provide automatic means whereby the incoming heat-transfer fluid from the central plant is selectively directed either through the cooling or heating devices of the local air conditioning unit.

Another object is to provide means whereby the common heat-transfer fluid may completely bypass an individual zone unit in the event that no change in the temperature of the zone is required.

A further object is to provide automatic means whereby such bypassing may be effected without requiring the attention of any human agency.

Another object is to provide means for sensing the temperature of the incoming fluid and for using the sensing means for controlling the valves that selectively direct the fluid through the heating or cooling apparatus in the individual zone, or into bypass pipes.

An additional object is to provide means whereby the temperature of the common heat-transfer medium is automatically brought down to a predetermined temperature by means of appropriate apparatus when the outdoor ambient temperature is above a predetermined level and for automatically heating the heat-transfer fluid when the outdoor ambient temperature is below a predetermined level.

A further object is the provision of means whereby the heat rejected to the medium by zones that are being cooled may be carried by the medium to zones that require heating.

Another object is to give maximum flexibility to a two-pipe system and to use the same two pipes that are normally used in conventional systems to supply and return the condenser water, to carry water for heating purposes as well.

Still another object is the provision of means for sensing the temperature of the incoming water at each zone unit and for automatically operating the water-diverting device for directing the water either to the heating or cooling apparatus in accordance with the findings of the sensing device.

Yet another object is to provide means whereby the unit control will actuate the water-diverting device in accordance with the zone thermostat and with the instrument that senses the temperature of the incoming water, so that the control device, if desired, may operate in accordance with the relationship between the findings of the zone thermostat and the incoming water-sensing device.

This invention possesses many other advantages, and has other objects which may be made more clearly apparent from a consideration of several embodiments of the invention. For this purpose, there are shown a few forms in the drawings accompanying and forming part of the present specification. These forms will now be described in detail to illustrate the general principles of the invention; but it is to be understood that this detailed description is not to be taken in a limiting sense, since the scope of the invention is best defined by the appended claims.

In the drawings:

FIG. 2 is a diagrammatic illustration of a modified embodiment of my invention in which the incoming water to a zone unit is directed by a plurality of valves operating automatically in accordance with a common control in response to the findings of a zone thermostat;

Figure 1:
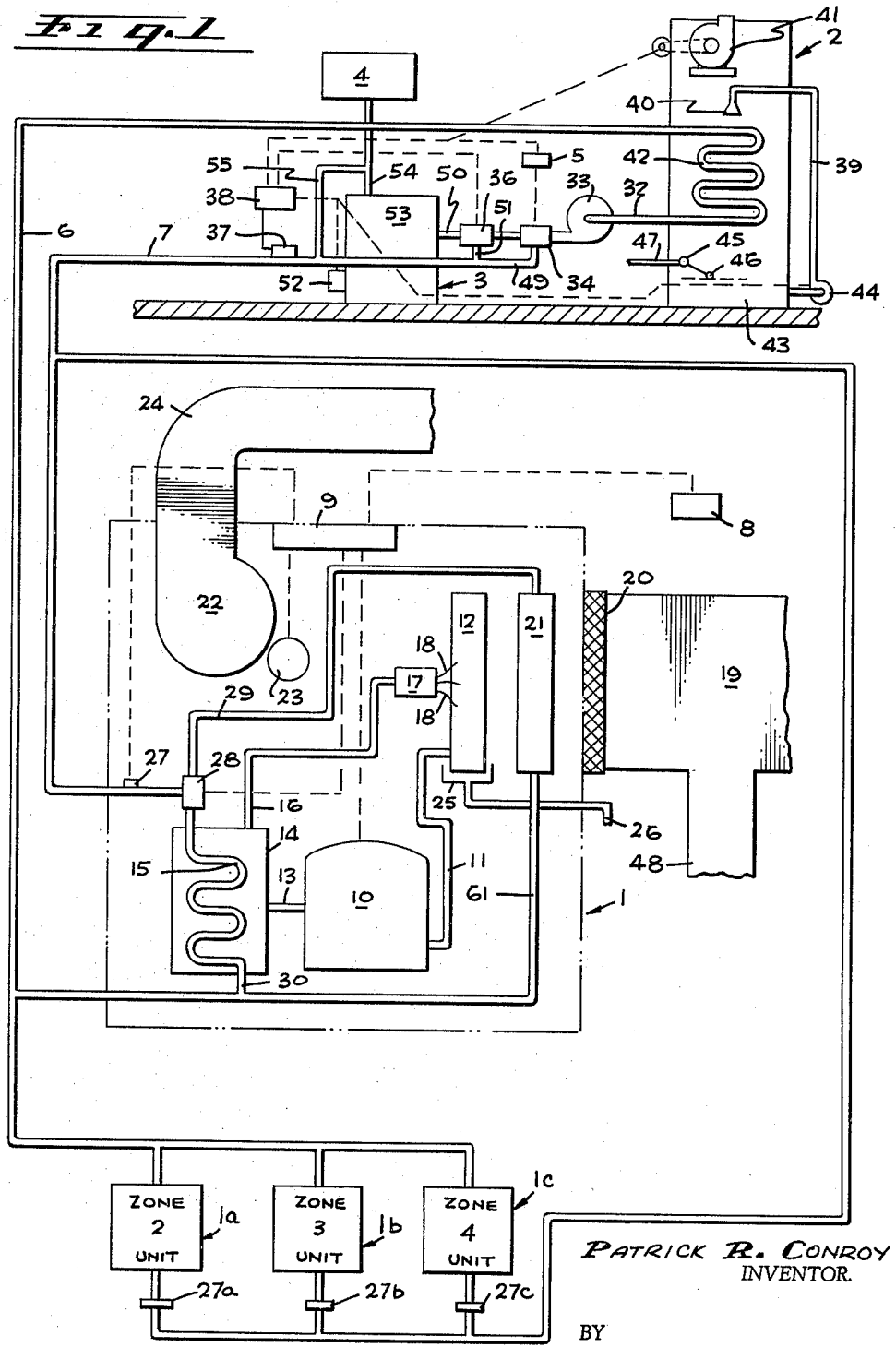
FIGURE 1 is a combined pictorial, diagrammatic and schematic view of a complete system embodying my invention for controlling the temperature in a plurality of zones.

FIG. 3 is a schematic diagram of another modified embodiment of my invention in which the incoming heat-transfer liquid is caused to bypass any given zone if no heat transfer is required; and FIG. 4 is a schematic illustration of apparatus for controlling a strip heater and the relative amounts of fresh air and of return air that are to pass through the air filter into the zone air conditioning equipment.

The individual zones in which the air temperature is to be controlled by my system have their own self-contained air conditioning units (1, 1a, 1b and 1c, FIG. 1), and all these individual units are served by a common "water-to-water" or "water-to-air" heat-rejection unit 2 (FIG. 1) hereinafter sometimes referred to as the system heat-rejector. The individual zone air conditioning units are also served by a common heating source 3, such, for example, as a gas-fired hot-water heater. This may be called the system heat source. The particular basic components used to make up the system heat-rejector and the system heat source are immaterial to my invention.

Apparatus embodying my invention is combined with these basic components and with the controlling means that maintains preselected water temperatures in accordance with a predetermined schedule of outdoor ambient temperature ranges.

The combination of the system heating source, the system heat-rejector, and the aforementioned controlling means may be said to constitute a water temperature controlling means. Most of the components making up the water temperature controlling means may all be located in the same general area, as, for instance, on the roof of the building, a location that is especially desirable for an evaporative condenser or a closed-circuit cooling tower. Such a location is also suitable for a water boiler having an expansion tank 4.

Associated with the complete water temperature conditioning means there is a control unit 38 that responds to an outdoor ambient temperature sensing device 5 and to an instrument 37 that senses the temperature of the water as it leaves the water temperature conditioning means, this control unit 38 determining (among other things) whether the returned water from the air conditioners in the individual zones, after passing through the coil 42, shall be routed through the water-heating apparatus 3 or returned directly to the zones through pipes 49 and 7, or whether the temperature of the water shall be modulated by sending a portion to the heating apparatus through line 50 and a portion into line 51 which connects to the zone supply line 7. The control unit also determines what these portions shall be.

The action of the outdoor ambient temperature-sensing device depends upon the particular critical temperature for which it is set. This critical temperature may vary for any given set of components and should be decided by the air conditioning system designer and by the capacity ranges of the individual components. This means, of course, that when the outdoor ambient temperature is above the predetermined critical value, the control unit 38 will activate the pump 44 to transfer water from the reservoir 43 to the sprinkling head 40 to be sprayed over the coil 42 and that it will also start the air circulator 41. Under these conditions, the control unit will of course cause the 3-way valve 34 to direct all the water from the system heat-rejector 2 through pipe 49 and the zone supply line 7.

When the outdoor ambient temperature drops below the critical value, the control unit 38 starts the heater 52 for the boiler 53, and deactivates the heat-rejector 2. The liquid heat-transfer medium, after passing through the coil 42, will then be either heated or modulated as determined by the control unit 38.

The overall operation of the system will probably best be understood by explaining the operation of one of the individual air conditioning units, such as the unit 1 shown in the center of the first page of the drawings.

Each zone is provided with its own thermostat 8. If this thermostat indicates that cooling is required, then the control center 9 starts the compressor 10, thus activating the refrigerant circuit. The compressor draws low-pressure refrigerant gas in the compressor through the suction line 11 from the evaporator coil 12. The compressing of this gas causes it to become super heated. It is then discharged through line 13 to the condenser 14 for cooling. Here the compressed gas rejects its heat to the heat-transfer fluid flowing through the coils 15. The resultant cooling transforms the gas into a high-pressure liquid.

The liquid refrigerant is then forced out of the condenser through line 16 by the pressure of the gas that enters the condenser through line 13 from the compressor. The liquid refrigerant flows through line 16 to the expansion device 17 from whence the liquid is distributed through the tubes 18 into the evaporator coil 12. Air from the zone that is being air conditioned is drawn through the air inlet 19, and in sequence through the filters 20, the presently inactive heating coil 21, and the evaporator 12 by the air-moving device 22. This device is driven by the motor 23 which is started by the control center 9 simultaneously with the actuation of the compressor 10 in response to the closing of the circuit by the zone thermostat 8. As this air moves through the evaporator 12, it causes the liquid refrigerant to evaporate, and such evaporation cools the air. Some of the moisture in the air may condense on these coils and fall into the drip pan 25, which is provided with the customary drain 26.

The cooled air passes from the air-moving device 22 into the air duct 24 that conducts it to the area or zone being air conditioned.

In passing over the evaporator coil 12, the air from the zone reaching the air conditioning unit through the inlet 19 rejected some of its heat to the refrigerant. As a consequence of the absorption of this heat, the refrigerant again becomes a gas. The cycle just described repeats itself as long as the motor 23 and the compressor 10 are in operation and as long as the liquid heat transfer medium in the coils 15 of the condenser are low enough to change the compressed refrigerant to a liquid state again.

A humidifier (not shown) may be installed between the cooler or evaporator 12 and the air-moving device 22, but this is optional, depending upon whether it is desired to humidfy the air.

The heat-transfer water or other fluid supplied to the air conditioning unit from the central plant through line 7 is supplied at a temperature as low as the heat-rejection source 2 will produce, or at the minimum recommended by the system designer.

The heat-sensing device 27 and the 3-way valve 28 and their manner of association with other components of the system contribute important improvements to air conditioning equipment. The 3-way valve 28 is capable of directing the temperature-conditioned water or other heat-transfer liquid entering the air conditioning unit via the supply pipe 7 either into the coil 15 of the condenser 14 in order to absorb heat that has been rejected from the zone air to the refrigerant, or into the pipe 29 that communicates with the heat-transfer device 21, where it is used to warm the zone air passing therethrough when heating is required.

If the zone thermostat 8 indicates that heating is required, the control center 9 will cause the incoming water to be diverted by the valve 28 into line 29. If the zone thermostat 8 indicates that cooling is required, and if the temperature of the incoming water as indicated by the sensor 27 is low enough to carry off the heat that has to be rejected from the refrigerant passing through the condenser 14, then the control center 9 will activate the compressor 10 and the refrigerant circuit as previously described. If the temperature of the incoming water as sensed by the sensor 27 is too high for proper operation of the refrigerant circuit, then the control center 9 will prevent operation of the compressor, irrespective of the demands of the zone thermostat 8.

The heat-transfer fluid from the coils 15, carrying the heat rejected from the refrigerant, passes from the condenser through lines 30 and 6 to the common fluid temperature conditioning equipment at the central plant. From line 6 the fluid passes first to the common heat-rejection source 2. This, of course, will be in operation only when the weather is warm. From the heat-rejection source 2, the heat-transfer fluid proceeds through line 32 to the fluid pump 33. This is the pump that keeps the heat-transfer fluid for the entire building in circulation. From the pump 33 the fluid enters the 3-way valve 34. When the heat-rejection source 2 is not in operation, the fluid enters the valve 34 at substantially the same temperature at which it enters the common heat-rejection source 2 from the return line 6. If the outdoor ambient temperature-sensing device 5 indicates that no heating is required, the 3-way control valve 34 will direct the fluid into line 7 where it again proceeds to the various individual air conditioning units. On the other hand, if the outdoor ambient temperature-sensing device indicates that the water temperature should be increased, then the 3-way valve 34 will direct the fluid to the 3-way modulating valve 36.

It is the function of the 3-way modulating valve 36 to direct the system's heat transfer water into line 7 or into the heater 3, or to direct part of it into the heater and part of it into line 7. The proportions are controlled by the main sensing unit 38 which is connected to the sensing device 37 that senses the temperature of the outgoing water. If this temperature is not as high as it should be, then the control device 38 causes the modulating 3-way valve 36 to direct more of the water into the heater. If the water passing through line 7 is hotter than required, then the control device 38 causes less water to be directed into the boiler and more into line 7.

Water from the heater 53 passes therefrom through the pipe 54, from which it flows through pipe 55 to the zone supply line 7.

In hot weather the condensing or cooling tower 2 would of course be in operation, and the heater would be turned off. The outdoor ambient temperature sensing device 5 in this case will still determine whether the 3-way valve 34 is to direct the water into line 7 or into the 3-way mixing valve 36. In extremely hot weather, it will of course go into line 7.

Heat may be taken from the system heat-rejection coil 42 by air that is drawn over it by the air-moving device 22 or by water from the reservoir or water sump 43 which the pump 44 forces through line 39 to the spray head 40 to be dispersed over the heat-rejection coil 42.

When the water in the reservoir 43 drops below a predetermined level, the float 46 turns on the valve 45 so that additional water is brought in through the main 47 to compensate for what has been lost through evaporation or seepage.

Returning now to the individual zone air conditioning unit 1 that I have been using as an exemplar of all the air conditioning units in the building, I will now describe the sequence of operations that take place in the unit when the zone thermostat 8 indicates that heating is required. In this case, the unit control center 9 instructs the 3-way valve 28 to direct the incoming heat-transfer medium into line 29 from which it flows into the heating coil 21 and thence through line 61 to the return pipe 6. Under these conditions, the evaporator 12 will not be in operation, and the air from the zone passing through the filter will be warmed as it passes over the heating coils 21. The passage of this air over the inactive coils or cells in the evaporator 12 will of course not affect the air, which will be drawn by the air-mover 22 directly into the air duct 24 from which it passes to the zone.

In the foregoing description of the operation of the air conditioning unit in its cooling and heating cycles, we have assumed that the only air passing through the unit is the air from the zone itself. However, provision is usually made for optionally adding fresh air to the system. Such air may enter through a fresh air duct 48. The introduction of this air may be effected by a manual control (not shown); or by a damper, or system of dampers, as illlustrated diagrammatically in FIG. 4, these dampers being actuated by the control unit 9a which is the counterpart of the control 9 in FIG. 1.

In the FIG. 4 diagram, two dampers 56 and 57 are shown, located respectively in the extension 19a' of the return air duct 19a and at the mouth of the fresh air duct 48'. As indicated in the figure, the linkage 58 is operated by a damper motor 59. Although the dampers 56 and 57 are jointly controlled in the particular arrangement illustrated, it will of course be understood that they may be individaully controlled by individual motors.

These dampers make it possible to shut out all fresh air from the duct 48' and to reuse the air from the return air duct 19a after it has been reconditioned in the air conditioning unit; or damper 56 may be kept closed and damper 57 opened to use fresh air only; or the dampers may be so arranged that preselected amounts of used air and fresh air may pass into the air conditioning unit through the filter 20a, which is the counterpart of the filter 20 shown diagrammatically in FIG. 1.

FIG. 4 also shows one way in which a strip heater may be used to supplement the heating provided by the heating coils 21 shown in FIG. 1, or as an alternate means for heating the zone. In this case, a strip heater is placed in the air duct 24a the counterpart of the duct 24 shown in FIG. 1. The operation of this strip heater 60 may be controlled by the control center 9a. Instead of providing merely supplementary heat, such a strip heater may supply all the heat when only such a moderate amount is required the heater 21 of the system shown in FIG. 1 may be turned off completely or when the fluid temperature is not hot enough to supply the necessary heating.

FIG. 2 illustrates diagrammatically a modification of the system shown in FIG. 1. In this embodiment of the invention, means are provided whereby the incoming heat-transfer fluid may be directed into a line 62 that bypasses the individual air conditioning unit, sending the fluid directly back to the central equipment to be either heated or cooled. In the arrangement shown in FIG. 2, the incoming fluid enters through line 7b where its temperature is sensed by the fluid temperature sensing device 27b associated with the control center 9b. The 3-way valve 28b directs this incoming fluid either through line 29b to the zone heating coils 21b or to the 3-way valve 28b', as may be determined by the control center 9b. Here an additional selection is made. If the sensing device 27b has sensed a fluid temperature too high to make the fluid serviceable for cooling, the fluid diverting device 28b' directs the fluid into the bypass line 62 from whence it is sent directly back to the central fluid temperature controlling apparatus through line 6b. Otherwise, valve 28b' directs the fluid through line 31b to the heat-rejecting device 14b, from which it is carried by pipes 30b, 61b and 6b to the fluid temperature control center. Fluid that passes through the heating coil 21b also returns through the pipes 61b and 6b.

The system illustrated diagrammatically in FIG. 2 is furthe illustrated in FIG. 3. This diagram shows fluid diverting equipment 28a associated with a control unit 9a with which the fluid temperature sensing device 27a communicates. The fluid diverting equipment 28a sends the fluid either to the heat-rejection device 14a through line 31, or to the heat-transfer device 21a into line 29a, or through the bypass line 62a which communicates with the return pipe 6a. Line 30a from the heat-rejection device 14a and line 61a from the heat-transfer device 21a are both connected to line 62a for the return of the fluid to the main return line 6a. Lines 30a and 61a may of course be directly connected to the return line 6a rather than to the bypass line 62a. Tubes 16a, 13a, and 11a are in the zone refrigerant circuit, these lines corresponding to the lines bearing the same identifying numerals without the lower case letter a in FIG. 1.

It will of course be understood that numerous other modifications and substitutions may be made in the equipment hereinbefore described and that any of the components may be omitted and replaced by others performing the same function or the same functions plus one or more additional functions, and it will be clear to those skilled in the art that the relative locations of various components within the system may be altered, and that various reversals and transpositions may also be made—all without departing from the broad spirit of the invention as set forth in the appended claims.

The inventor claims:

1. In a multi-unit air-conditioning installation having individual air-conditioning units for the various zones or rooms to be iar-conditioned: a central plant for supplying heat transfer fluid to all of the individual units at a temperature which is determined in accordance with the ambient outdoor temperature; a first fluid-conveying means conveying said fluid from said central plant to the various units; a second fluid-conveying means returning said fluid from said units to said central plant; each of said zones comprising a zone temperature control, a zone thermostat communicating with said control, a fluid heat sensor operatively associated with said control for sensing the temperature of the fluid supplied to the zone by said first fluid-conveying means, and means for creating an airflow from the associated air-conditioning unit to and through said zone and back to said air-conditioning unit; each of said air-conditioning units comprising a heat exchanger having ends communicating with said first and second fluid conveying means for transferring heat from the heat transfer fluid entering said unit to the air that is enroute from said unit to said zone, a closed circuit refrigerating system containing a refrigerant and embodying an evaporator disposed downstream of said heat exchanger in said unit, a compressor and a heat rejector comprising a condenser having cooling coils operatively interposed between said first fluid conveying means and said second fluid conveying means, said evaporator acting to transfer heat from air that has passed through said zone to the liquid refrigerant received from the condenser, said compressor acting to compress the refrigerant received from said evaporator, and said heat rejector acting to condense the refrigerant and reject its heat to the heat transfer fluid in said coils; said zone comprising a fluid-diverting valve for directing the incoming fluid from said first fluid-conveying means to said heat exchanger or said heat rejector as determined by said zone temperature control in accordance with the temperature of said fluid and the temperature of said zone; and means whereby said zone temperature control communicates with and controls said fluid-diverting valve.

2. In a multi-unit air-conditioning installation having individual air-conditioning units for the various zones or rooms to be air-conditioned: a central plant for supplying heat transfer fluid to all of the individual units at a temperature which is determined in accordance with the ambient outdoor temperature; a first fluid-conveying means conveying said fluid from said central plant to the various units; a second fluid-conveying means returning said fluid from said units to said central plant; each of said zones comprising a zone temperature control, a zone thermostat communicating with said control, a fluid heat sensor operatively associated with said control for sensing the temperature of the fluid supplied to the zone by said first fluid-conveying means, and means for creating an air-flow from the associated air-conditioning unit to and through said zone and back to said air-conditioning unit; each of said air-conditioning units comprising a heat exchanger having ends communicating with said first and second fluid-conveying means for transferring heat from the heat transfer fluid entering said unit to the air that is enroute from said unit to said zone, a closed circuit refrigerating system containing a refrigerant and embodying an evaporator disposed downstream from said heat exchanger in said unit, a compressor and a heat rejector comprising a condenser having cooling coils operatively interposed between said first fluid conveying means and said second fluid-conveying means, said evaporator acting to transfer heat from air that has passed through said zone to the liquid refrigerant in the evaporator, said compressor acting to compress the refrigerant received from the evaporator, and said heat rejector acting to condense the refrigerant and reject its heat to the heat transfer fluid in said coils; said zone comprising first and second fluid-directing valves, said first fluid-directing valve selectively directing the incoming fluid from said first fluid-conveying means to said heat exchanger or to said second fluid-directing valve as determined by said zone temperature control in accordance with the temperature of said fluid and the temperature of said zone, and said second valve directing the fluid received thereby either through said cooling coils or directly back to said central plant as determined by said zone control in accordance with whether or not its temperature is too hot to be serviceable for cooling; and means whereby said zone temperature control communicates with and controls both of said fluid diverting means.

3. In a multi-unit air-conditioning installation having individual air-conditioning units for the varous zones or rooms to be air-conditioned: a central plant for supplying heat transfer fluid to all of the individual units at a temperature which is determined in accordance with the ambient outdoor temperature; a first fluid-conveying means conveying said fluid from said central plant to the various units; a second fluid-conveying means returning said fluid from said units to said central plant; a first air duct leading from said zone to said individual unit; a second air duct leading from said individual unit to said zone; each of said zones comprising a zone temperature control, a zone thermostat communicating with said control, and a fluid heat sensor operatively associated with said control for sensing the temperature of the fluid supplied to the zone by said first fluid-conveying means; each of said air-conditioning units comprising a heat exchanger having ends communicating with said first and second fluid conveying means and a closed circuit refrigerating system containing a refrigerant and embodying an evaporator disposed downstream of said heat exchanger in said unit, a compressor and a heat rejector comprising a condenser having cooling coils operatively interposed between said first fluid conveying means and said second fluid-conveying means, and an air-moving instrumentality for drawing air from said first duct and through said heat exchanger and said evaporator and directing it into said second duct; said heat exchanger acting to transfer heat from the air passing therethrough to the heat transfer fluid entering said unit, said evaporator acting to transfer heat from air passing therethrough to the liquid refrigerant in the evaporator, said compressor acting to compress the refrigerant received from said evaporator, and said heat rejector acting to condense the refrigerant and reject its heat to the heat transfer fluid in said coils; said zone comprising a fluid-diverting valve for selectively directing the incoming fluid from said first fluid-conveying means to said heat exchanger or to said heat rejector as determined by said zone temperature control in accordance with the temperature of said fluid and the temperature of said zone; and means whereby said zone temperature control communicates with and controls said fluid-diverting valve.

4. The combination set forth in claim 3 with the addition of a strip heater in said second air duct activated by said zone temperature control in accordance with the temperature of said fluid and the heat requirements of the zone as indicated by said thermostat.

5. The combination set forth in claim 4 with the addition of an outside air entry port communicating with said first duct, a first shutter for opening and closing said air entry port, a second shutter located in said first duct between said air entry port and said zone, and means for selectively opening or closing either or both of said shutters.

6. The combination set forth in claim 3 with the addition of an outside air entry port communicating with said first duct, a first shutter for opening and closing said air entry port, a second shutter located in said first duct between said air entry port and said zone, and means for selectively opening or closing either or both of said shutters.

References Cited by the Examiner
UNITED STATES PATENTS

| | | | |
|---|---|---|---|
| 2,257,540 | 9/1941 | Smellie | 165—27 X |
| 2,715,514 | 8/1955 | Stair | 165—50 X |
| 2,715,515 | 8/1955 | Stair | 165—28 X |
| 3,069,867 | 12/1962 | Ringquist | 165—50 X |

JAMES W. WESTHAVER, *Primary Examiner.*

CHARLES SUKALO, ROBERT A. O'LEARY,
*Examiners.*